United States Patent
Yamanaka et al.

(10) Patent No.: US 7,236,703 B1
(45) Date of Patent: Jun. 26, 2007

(54) OPTICAL WAVELENGTH DIVISION MULTIPLEXING DEVICE

(75) Inventors: Shigeo Yamanaka, Tokyo (JP); Takashi Mizuochi, Tokyo (JP); Katsuhiro Shimizu, Tokyo (JP); Koji Goto, Tokyo (JP); Shinichi Nakagawa, Tokyo (JP); Eiichi Shibano, Tokyo (JP); Tadami Yasuda, Tokyo (JP)

(73) Assignees: Mitsubishi Denki Kabushiki Kaisha, Tokyo (JP); KDDI Submarine Cable Systems Inc., Tokyo (JP)

( * ) Notice: Subject to any disclaimer, the term of this patent is extended or adjusted under 35 U.S.C. 154(b) by 532 days.

(21) Appl. No.: 10/088,503

(22) PCT Filed: Jul. 31, 2000

(86) PCT No.: PCT/JP00/05151

§ 371 (c)(1),
(2), (4) Date: Mar. 28, 2002

(87) PCT Pub. No.: WO02/11337

PCT Pub. Date: Feb. 7, 2002

(51) Int. Cl.
*H04J 14/02* (2006.01)

(52) U.S. Cl. .......................................... 398/82; 398/68

(58) Field of Classification Search ............. 398/1–124
See application file for complete search history.

(56) References Cited

U.S. PATENT DOCUMENTS

| | | | | |
|---|---|---|---|---|
| 4,441,181 A | * | 4/1984 | Winzer et al. ................. 398/87 |
| 5,675,432 A | * | 10/1997 | Kosaka ................... 359/337.13 |
| 5,878,025 A | * | 3/1999 | Tomonaga et al. ........... 370/219 |
| 6,021,235 A | * | 2/2000 | Yamamoto et al. ............ 385/24 |
| 6,041,152 A | * | 3/2000 | Clark ............................ 385/24 |
| 6,091,538 A | * | 7/2000 | Takeda et al. .......... 359/341.41 |
| 6,307,668 B1 | * | 10/2001 | Bastien et al. ............ 359/337.1 |
| 6,323,994 B1 | * | 11/2001 | Li et al. .................... 359/341.1 |
| 6,567,196 B1 | * | 5/2003 | Archambault ................. 398/79 |
| 6,690,886 B1 | * | 2/2004 | Guy .............................. 398/81 |
| 6,708,002 B1 | * | 3/2004 | Novak et al. .................. 398/79 |
| 6,721,508 B1 | * | 4/2004 | Gerstel et al. ................. 398/83 |
| 6,782,203 B2 | * | 8/2004 | Lin et al. ....................... 398/82 |
| 2004/0264956 A1 | * | 12/2004 | Touma ........................ 398/37 |

FOREIGN PATENT DOCUMENTS

| | | |
|---|---|---|
| JP | 01-282931 | 11/1989 |
| JP | 5-327662 | 12/1993 |
| JP | 8-46595 | 2/1996 |

(Continued)

*Primary Examiner*—Christina Leung
(74) *Attorney, Agent, or Firm*—Oblon, Spivak, McClelland, Maier & Neustadt, P.C.

(57) ABSTRACT

As is described above, an optical wavelength division multiplexing and transmission apparatus according to the present invention has the configuration in which a plurality of slave racks coupling to a master rack can be additionally installed one after another with the master rack. Therefore, in cases where it is desired to expand a function of a transmitter and a function of a receiver due to the increase of a quality of information to be transmitted, the additional installation of the slave rack can be performed without exerting influence on a communication means installed in advance and currently used. Accordingly, it can be expected that the optical wavelength division multiplexing and transmission apparatus is adapted for the optical communication service which is more and more increased in the future.

13 Claims, 6 Drawing Sheets

FOREIGN PATENT DOCUMENTS

| | | |
|---|---|---|
| JP | 10-028106 | 1/1998 |
| JP | 11-103286 | 4/1999 |
| JP | 11-149097 | 6/1999 |
| JP | 11-239369 | 8/1999 |
| JP | 11-331095 | 11/1999 |
| JP | 2000-92001 | 3/2000 |
| JP | 2000-183815 | 6/2000 |

* cited by examiner

OPTICAL WAVELENGTH DIVISION MULTIPLEXING DEVICE

TECHNICAL FIELD

The present invention relates to an optical wavelength division multiplexing and transmission apparatus adapted for a wavelength division multiplexing and transmission system in which a plurality of optical wavelength signals having wavelengths different from each other are multiplexed and transmitted.

BACKGROUND ART

FIG. 1 is a block diagram showing the configuration of a conventional optical wavelength division multiplexing and transmission apparatus. In FIG. 1, 101 indicates a transmitter end rack. 102 indicates a rack of a receiver end. The transmitter end rack 101 accommodates an optical wavelength multiplexer 111 and an amplifier 112. A plurality of input optical wavelength signals are multiplexed in the optical wavelength multiplexer 111, and an output of the optical wavelength multiplexer 111 is optically-amplified in the amplifier 112. The receiver end rack 102 accommodates an amplifier 114 and an optical wavelength demultiplexer 115. A multiplexed signal is transmitted and optically-amplified in the amplifier 114, and an output of the amplifier 114 is demultiplexed in the optical wavelength demultiplexer 115 to a plurality of optical wavelength signals having wavelengths different from each other. 113 indicates an optical transmission line formed of an optical fiber which connects the transmitter end rack 101 and the receiver end rack 102. A plurality of optical relaying units are normally placed at appropriate positions of the optical transmission line 113. However, the optical relaying units are omitted in this specification to simplify the description.

Next, an operation will be described below.

In a wavelength division multiplexing and transmission system (hereinafter, called WDM transmission system), a large number of types of information are respectively assigned to a plurality of optical wavelength signals having wavelengths different from each other to convert the types of information into the optical wavelength signals. In the transmitter end rack 101, the converted optical wavelength signals $\lambda 1, \lambda 2, \lambda 3, \ldots$ and $\lambda n$ are taken out from the optical wavelength multiplexer 111 as a multiplexed signal. This multiplexed signal is amplified in the amplifier 112 and is sent out to the optical transmission line 113. In the receiver end rack 102, the multiplexed signal transmitted through the optical transmission line 113 is amplified in the amplifier 114 and is demultiplexed to the optical wavelength signals $\lambda 1, \lambda 2, \lambda 3, \ldots$ and $\lambda n$ having wavelengths different from each other in the optical wavelength demultiplexer 115. The optical wavelength signals $\lambda 1, \lambda 2, \lambda 3, \ldots$ and $\lambda n$ taken out from the optical wavelength demultiplexer 115 are demodulated in a latter stage to a plurality of electric signals denoting the types of original information.

Because the conventional optical wavelength division multiplexing and transmission apparatus has the above-described configuration, it is not easy to expand a multiplex function so as to increase the number of optical wavelength signals. A plurality of wavelengths of a plurality of optical wavelength signals multiplexed in an optical wavelength multiplexer are set to be placed at wavelength intervals so as not to interfere with each other. Therefore, in cases where the number of optical wavelength signals multiplexed with each other is increased due to the increase of a quantity of information to be transmitted, wavelengths assigned to pieces of information and possible to be processed in both an optical wavelength multiplexer and an optical wavelength demultiplexer run short. In this case, it is required to replace both the optical wavelength multiplexer and the optical wavelength demultiplexer with both another optical wavelength multiplexer and another optical wavelength demultiplexer in which additional optical wavelength signals can be received and processed. However, because both the optical wavelength multiplexer and the optical wavelength demultiplexer set in operation are taken out from the conventional optical wavelength division multiplexing and transmission apparatus, the communication is interrupted during the replacement. Therefore, a problem has arisen that it is not easy to actually perform the replacement.

The present invention is provided to solve the above-described problem, and the object of the present invention is to provide an optical wavelength division multiplexing and transmission apparatus in which both an optical wavelength multiplexer and an optical wavelength demultiplexer for an early operation are installed at an processing capacity corresponding to a prescribed number of optical wavelength signals to suppress an initial cost and a plurality of groups of other optical wavelength multiplexers and other optical wavelength demultiplexers suitable for the demand of communication are additionally installed one after another while maintaining a communication condition.

DISCLOSURE OF THE INVENTION

An optical wavelength division multiplexing and transmission apparatus according to the present invention comprises a master rack and at least a slave rack possible to be combined with and coupled to the master rack. A structure body of the master rack accommodates a first optical wavelength multiplexer, in which a plurality of prescribed optical wavelength signals of a group are multiplexed with each other and a first multiplexed signal is output, and a synthetic optical wavelength multiplexer in which the first multiplexed signal output from the first optical wavelength multiplexer and a second multiplexed signal are multiplexed with each other and a synthetic multiplexed signal is output. A structure body of the slave rack accommodates a second optical wavelength multiplexer in which a plurality of optical wavelength signals of a group having a wavelength distribution different from that of the group of prescribed optical wavelength signals multiplexed by the first optical wavelength multiplexer are multiplexed with each other and are output as the second multiplexed signal.

Therefore, in the WDM transmission system, in cases where the number of optical wavelength signals multiplexed is small in the early operation and it is expected that the number of optical wavelength signals multiplexed is increased in the future, the optical wavelength signals are divided in advance into a plurality of groups, and the slave rack is additionally installed for each group without stopping the system installed for the early operation in the additional installation. Accordingly, the optical wavelength division multiplexing and transmission apparatus can be widely used for various purposes.

An optical wavelength division multiplexing and transmission apparatus according to the present invention comprises a master rack and at least a slave rack possible to be combined with and coupled to the master rack. A structure body of the master rack accommodates a synthetic optical wavelength demultiplexer in which a synthetic multiplexed signal formed by multiplexing a plurality of multiplexed signals, which are respectively formed of a plurality of groups of optical wavelength signals having a plurality of optical wavelength distributions different from each other, with each other is received, the synthetic multiplexed signal is demultiplexed to both a first multiplexed signal and a second multiplexed signal and both the first multiplexed signal and the second multiplexed signal are output, and a first optical wavelength demultiplexer in which the first multiplexed signal output by the synthetic optical wavelength demultiplexer is demultiplexed to a plurality of optical wavelength signals of one group and the group of optical wavelength signals is output. A structure body of the slave rack accommodates a second optical wavelength demultiplexer in which the second multiplexed signal output by the synthetic optical wavelength demultiplexer is demultiplexed to a plurality of optical wavelength signals of another group and the group of optical wavelength signals is output.

Therefore, a plurality of slave racks can be additionally installed one after another on a receiver end without stopping the system installed for the early operation in the additional installation. Accordingly, the optical wavelength division multiplexing and transmission apparatus can be widely used for various purposes.

An optical wavelength division multiplexing and transmission apparatus according to the present invention comprises a master rack and at least a slave rack possible to be combined with and coupled to the master rack. A structure body of the master rack accommodates a first optical wavelength multiplexer in which a plurality of prescribed optical wavelength signals of a group are multiplexed with each other and a first multiplexed signal is output, a synthetic optical wavelength multiplexer in which the first multiplexed signal output from the first optical wavelength multiplexer and a second multiplexed signal are multiplexed with each other and a first synthetic multiplexed signal is output, a synthetic optical wavelength demultiplexer in which a second synthetic optical wavelength transmitted from another optical wavelength division multiplexing and transmission apparatus of an opposite end through an optical transmission line is demultiplexed to both a third multiplexed signal and a fourth multiplexed signal and both the third multiplexed signal and the fourth multiplexed signal are output, and a first optical wavelength demultiplexer in which the third multiplexed signal output from synthetic optical wavelength demultiplexer is demultiplexed to a plurality of optical wavelength signals of a group and the group of optical wavelength signals is output. A structure body of the slave rack accommodates a second optical wavelength multiplexer in which a plurality of optical wavelength signals of a group having a wavelength distribution different from that of the group of prescribed optical wavelength signals multiplexed by the first optical wavelength multiplexer are multiplexed with each other and are output as the second multiplexed signal, and a second optical wavelength demultiplexer in which the fourth multiplexed signal output by the synthetic optical wavelength demultiplexer is demultiplexed to a plurality of optical wavelength signals of another group and the group of optical wavelength signals is output.

Therefore, because each of the master rack and the slave rack has both a function of multiplying the optical wavelength signals and a function of demultiplying the multiplexed signal, the functions can be simultaneously added in the additional installation. Also, a plurality of slave racks can be additionally installed one after another on a receiver end without stopping the system installed for the early operation in the additional installation. Accordingly, the optical wavelength division multiplexing and transmission apparatus can be widely used for various purposes.

On a transmitter end, an optical wavelength division multiplexing and transmission apparatus according to the present invention further comprises a plurality of noise cut filters corresponding to the first multiplexed signal and the second multiplexed signal respectively on an input side of the synthetic optical wavelength multiplexer on which the first multiplexed signal and the second multiplexed signal are input.

Therefore, because only effective wavelength components are taken out from the multiplexed signals and are transmitted, the transmission quality of the multiplexed signals can be improved. Also, a plurality of slave racks can be additionally installed one after another on the transmitter end without stopping the system installed for the early operation in the additional installation. Accordingly, the optical wavelength division multiplexing and transmission apparatus can be widely used for various purposes.

On a transceiver side, an optical wavelength division multiplexing and transmission apparatus according to the present invention further comprises a plurality of noise cut filters corresponding to the first multiplexed signal and the second multiplexed signal respectively on an input side of the synthetic optical wavelength multiplexer on which the first multiplexed signal and the second multiplexed signal are input.

Therefore, only effective wavelength components can be taken out of the multiplexed signals in the transmission operation and can be transmitted. Also, because each rack has both the transmission function and the reception function, the functions can be simultaneously added in the additional installation, and a plurality of slave racks can be additionally installed one after another without stopping the system installed for the early operation in the additional installation. Accordingly, the optical wavelength division multiplexing and transmission apparatus can be widely used for various purposes.

On a transmitter end, an optical wavelength division multiplexing and transmission apparatus according to the present invention further comprises a plurality of dispersion compensation fibers corresponding to the first multiplexed signal and the second multiplexed signal respectively on an input side of the synthetic optical wavelength multiplexer on which the first multiplexed signal and the second multiplexed signal are input.

Therefore, the distortion of effective wavelength components of the multiplexed signals given by an optical fiber of the transmission line can be compensated, and the transmission quality of the multiplexed signals can be heightened. Also, a plurality of slave racks can be additionally installed one after another in the transmitter without stopping the system for the early operation in the additional installation. Accordingly, the optical wavelength division multiplexing and transmission apparatus can be widely used for various purposes.

On a transceiver side, an optical wavelength division multiplexing and transmission apparatus according to the present invention further comprises a plurality of dispersion compensation fibers corresponding to the first multiplexed signal and the second multiplexed signal respectively on an input side of the synthetic optical wavelength multiplexer on which the first multiplexed signal and the second multiplexed signal are input.

Therefore, the distortion of effective wavelength components of the multiplexed signals given by an optical fiber of a transmission line can be compensated, and the transmission quality of the multiplexed signals can be heightened. Also, because each rack has both the transmission function and the reception function, the functions can be simultaneously added in the additional installation, and a plurality of slave racks can be additionally installed one after another without stopping the system installed for the early operation in the additional installation. Accordingly, the optical wavelength division multiplexing and transmission apparatus can be widely used for various purposes.

An optical wavelength division multiplexing and transmission apparatus according to the present invention further comprises an amplifier of the master rack for the first multiplexed signal, an amplifier of the master rack for the synthetic multiplexed signal, a wavelength level monitoring device of the master rack for monitoring an output of the amplifier for the synthetic multiplexed signal, an amplifier of the slave rack for the second multiplexed signal, and a plurality of output control circuits for selectively controlling a plurality of levels of signals output from the amplifier for the first multiplexed signal, the amplifier for the second multiplexed signal and the amplifier for the synthetic multiplexed signal respectively in response to a detection output of the wavelength level monitoring device in which a plurality of levels of the optical wavelength signals of the first multiplexed signal, the second multiplexed signal and the synthetic multiplexed signal are monitored.

Therefore, level differences among the multiplexed signals of the groups of the optical wavelength signals can be corrected before the signal transmission, and the transmission qualities of the multiplexed signals can be equally maintained. Also, as the transmitter, a plurality of slave racks can be additionally installed one after another without stopping the system installed for the early operation in the additional installation. Accordingly, the optical wavelength division multiplexing and transmission apparatus can be widely used for various purposes.

BEST MODE FOR CARRYING OUT THE INVENTION

Hereinafter, the best mode for carrying out the present invention will now be described with reference to the accompanying drawings to explain the present invention in more detail.

Embodiment 1

Figure 1:
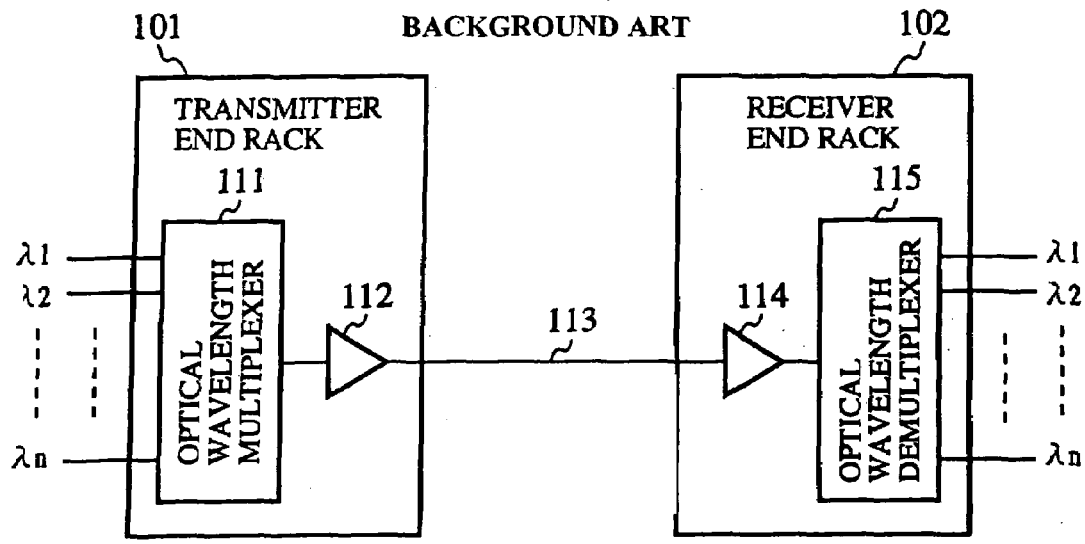
FIG. 1 is a block diagram showing the configuration of a conventional optical wavelength division multiplexing and transmission apparatus.
Figure 2:
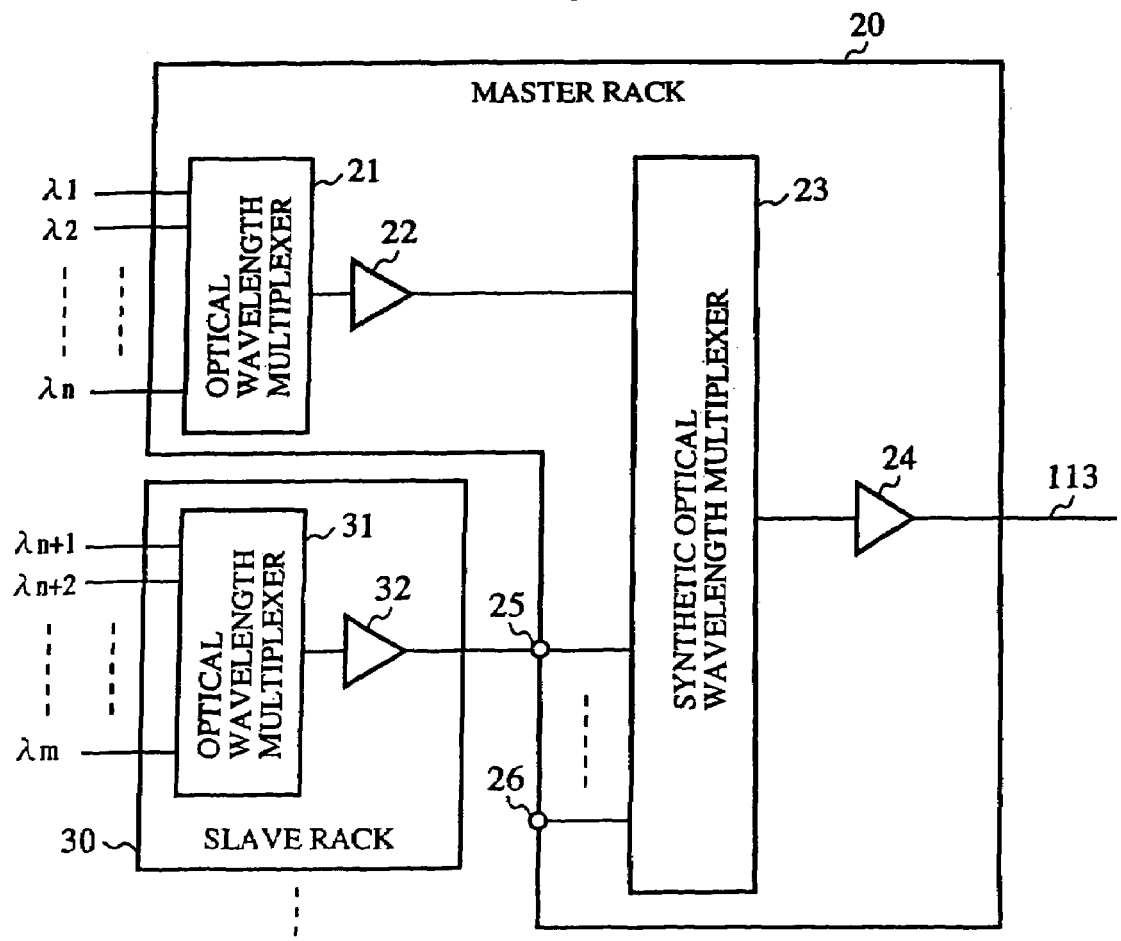
FIG. 2 is a block diagram showing an optical wavelength division multiplexing and transmission apparatus according to a first embodiment of the present invention.

A block diagram of the configuration of a transmission side of an optical wavelength division multiplexing and transmission apparatus is shown in FIG. 2. In FIG. 2, 20 indicates a master rack. 30 indicates a slave rack possible to be combined with and coupled to the master rack 20. Though a plurality of slave racks 30 can be additionally installed according to a scale of an optical circuit placed in the master rack 20, to simplify the description, one slave rack 30 of the smallest number is shown.

A structure body of the master rack 20 accommodates an optical wavelength multiplexer (or first optical wavelength multiplexer) 21, an amplifier 22, an amplifier 24 and a synthetic optical wavelength multiplexer 23 integrally placed with each other. Also, a structure body of the slave rack 30 accommodates an optical wavelength multiplexer (or second optical wavelength multiplexer) 31 and an amplifier 32 integrally placed with each other. The slave rack 30 is coupled to the master rack 20, and an optical output of the slave rack 30 is input to the synthetic optical wavelength multiplexer 23 through an optical connector 25. In the same manner, the same type of slave rack as that of the slave rack 30 can be connected to an optical connector 26. Here, the master rack 20 has an interface so as to prevent the influence occurring in the additional installation of another slave rack 30.

In the master rack 20, a plurality of optical wavelength signals $\lambda 1, \lambda 2, \ldots$ and $\lambda n$ of one group formed in a prescribed optical wavelength distribution are input and multiplexed in the optical wavelength multiplexer 21. Thereafter, a multiplexed signal (or first multiplexed signal) output from the optical wavelength multiplexer 21 is amplified to a prescribed level in the amplifier 22 and is input to the synthetic optical wavelength multiplexer 23. In cases where the slave rack 30 is not connected to the master rack 20, the multiplexed signal input to the synthetic optical wavelength multiplexer 23 is output from the synthetic optical wavelength multiplexer 23 as a synthetic multiplexed signal without processing the multiplexed signal and is transmitted to a receiver of the opposite end through both the amplifier 24 and an optical transmission line 113. As is described above, in cases where the number of optical wavelength signals to be transmitted is small in the early stage in which the WDM transmission system is structured, only the master rack 20 is installed and operated.

In cases where the increase of the number of optical wavelength signals to be transmitted is required due to the increase of a quantity of information, the multiplex and transmission capability of only the master rack 20 currently set in operation is not sufficient. In this case, the slave rack 30 is coupled to the master rack 20. In this coupling operation, though the amplifier 32 is connected to the synthetic optical wavelength multiplexer 23 through the optical connector 25, the transmission function of the master rack 20 currently operated is not stopped. A group of a plurality of optical wavelength signals $\lambda n+1, \lambda n+2, \ldots$ and $\lambda m$, which are input to the optical wavelength multiplexer 31 and are multiplexed, is formed to have a wavelength distribution different from that of the group of optical wavelength signals λ1, λ2, . . . and λn. A multiplexed signal (or second multiplexed signal) output from the optical wavelength multiplexer 31 is amplified in the amplifier 32 and is fed to the synthetic optical wavelength multiplexer 23 of the master rack 20. Thereafter, the multiplexed signal is multiplexed with other multiplexed signals and is transmitted to the receiver of the opposite end as a synthetic multiplexed signal.

As is described above, in the first embodiment, the slave rack 30 can be easily and additionally installed in the optical wavelength division multiplexing and transmission apparatus without stopping the operation of the system installed for the early operation system. Accordingly, in the WDM transmission system, in cases where the number of optical wavelength signals multiplexed with each other is small in the early operation and it is expected that the number of optical wavelength signals multiplexed with each other is increased in the future, the optical wavelength signals increased in the future are divided in advance into a plurality of groups, and the slave rack 30 can be additionally installed for each group. Therefore, the optical wavelength division multiplexing and transmission apparatus can be widely used for various purposes.

Embodiment 2

Figure 3:
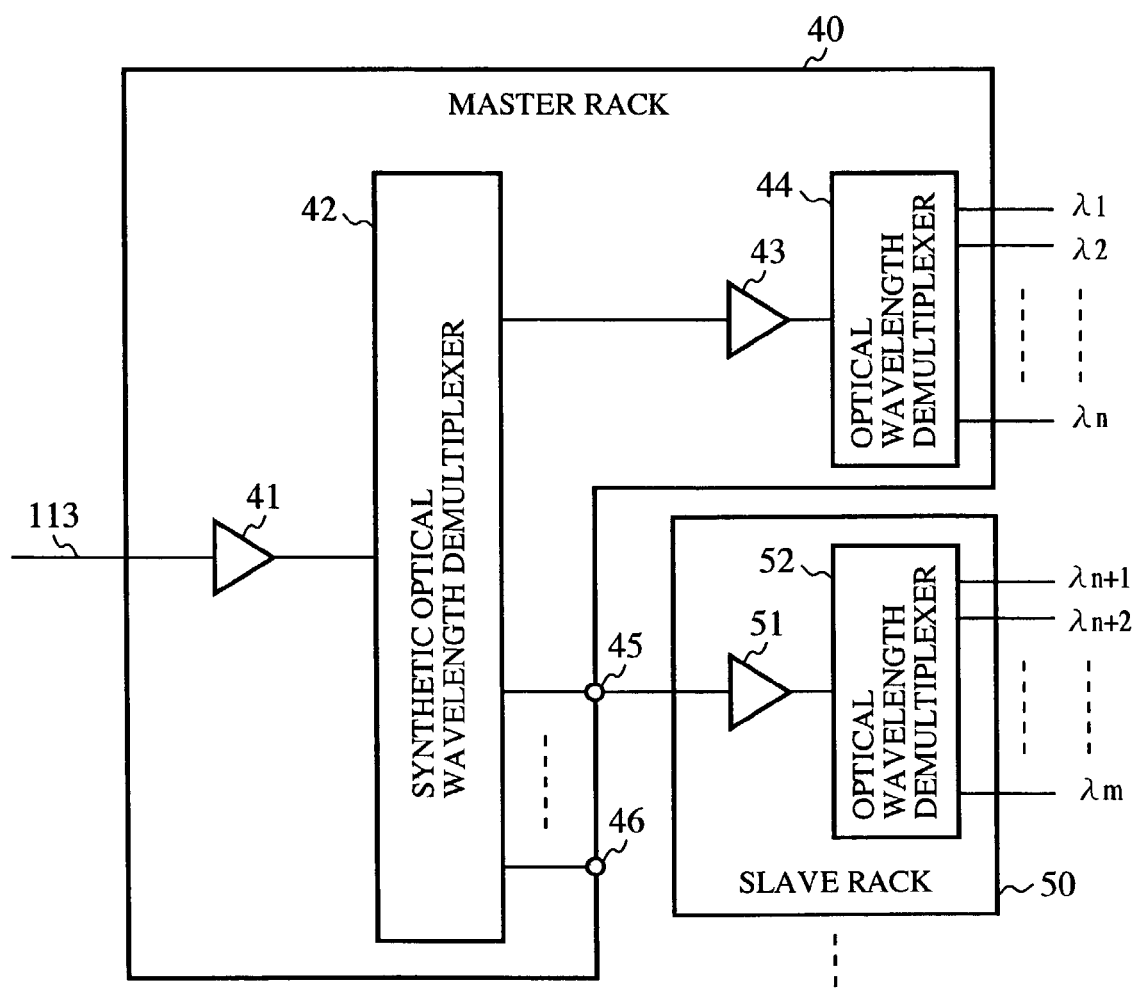
FIG. 3 is a block diagram showing an optical wavelength division multiplexing and transmission apparatus according to a second embodiment of the present invention.

A block diagram of the configuration of a reception side of an optical wavelength division multiplexing and transmission apparatus is shown in FIG. 3. In FIG. 3, 40 indicates a master rack. The master rack 40 accommodates an amplifier 41, an amplifier 43, a synthetic optical wavelength demultiplexer 42 and an optical wavelength demultiplexer (or first optical wavelength demultiplexer) 44. 50 indicates a slave rack. The slave rack 50 accommodates an amplifier 51 and an optical wavelength demultiplexer (or second optical wavelength demultiplexer) 52. The slave rack 50 can be coupled to the master rack 40 at any time. In cases where the slave rack 50 is additionally installed, an optical signal of the master rack 40 is couple to the slave rack 50 through an optical connector 45. The master rack 40 or the slave rack 50 has an interface to perform this signal coupling.

Next, an operation will be described below.

A synthetic multiplexed signal, which is transmitted from an opposite end transmitter having the configuration shown in FIG. 2 through the optical transmission line 113, is amplified in the amplifier 41 and is input to the synthetic optical wavelength demultiplexer 42. Here, a plurality of optical wavelength signals λ1, λ2, . . . and λn of wavelengths different from each other and having an optical wavelength distribution are multiplexed with each other to form a multiplexed signal, a plurality of optical wavelength signals λn+1, λn+2, . . . and λm having wavelengths different from each other and having an optical wavelength distribution different from that of the group of the optical wavelength signals λ1, λ2, . . . and λn are multiplexed with each other to form another multiplexed signal, and the synthetic multiplexed signal is formed by multiplexing the multiplexed signals with each other. A multiplexed signal (or first multiplexed signal) formed by the demultiplexing of the synthetic optical wavelength demultiplexer 42 is amplified in the amplifier 43 and is input to the optical wavelength demultiplexer (or first optical wavelength demultiplexer) 44. Thereafter, the multiplexed signal is demultiplexed to the optical wavelength signals λ1, λ2, . . . and λn of one group in the optical wavelength demultiplexer 44, and the group of the optical wavelength signals λ1, λ2, . . . and λn is sent to a circuit of a latter stage. In cases where the slave rack 50 is additionally installed due to the increase of a quantity of information to be transmitted, another multiplexed signal (or second multiplexed signal) formed by the demultiplexing of the synthetic optical wavelength demultiplexer 42 is fed to the amplifier 51 through the optical connector 45 and is amplified. Thereafter, the multiplexed signal is input to the optical wavelength demultiplexer (or second optical wavelength demultiplexer) 52 and is demultiplexed to the optical wavelength signals λn+1, λn+2, . . . and λm of one group.

As is described above, in the second embodiment, the receiver end of the optical wavelength division multiplexing and transmission apparatus has the configuration in which the slave rack 50 can be additionally installed. Accordingly, the slave rack 50 can be easily and additionally installed in the optical wavelength division multiplexing and transmission apparatus without stopping the operation of the system installed for the early operation, and the optical wavelength division multiplexing and transmission apparatus can be widely used for various purposes.

Embodiment 3

Figure 4:
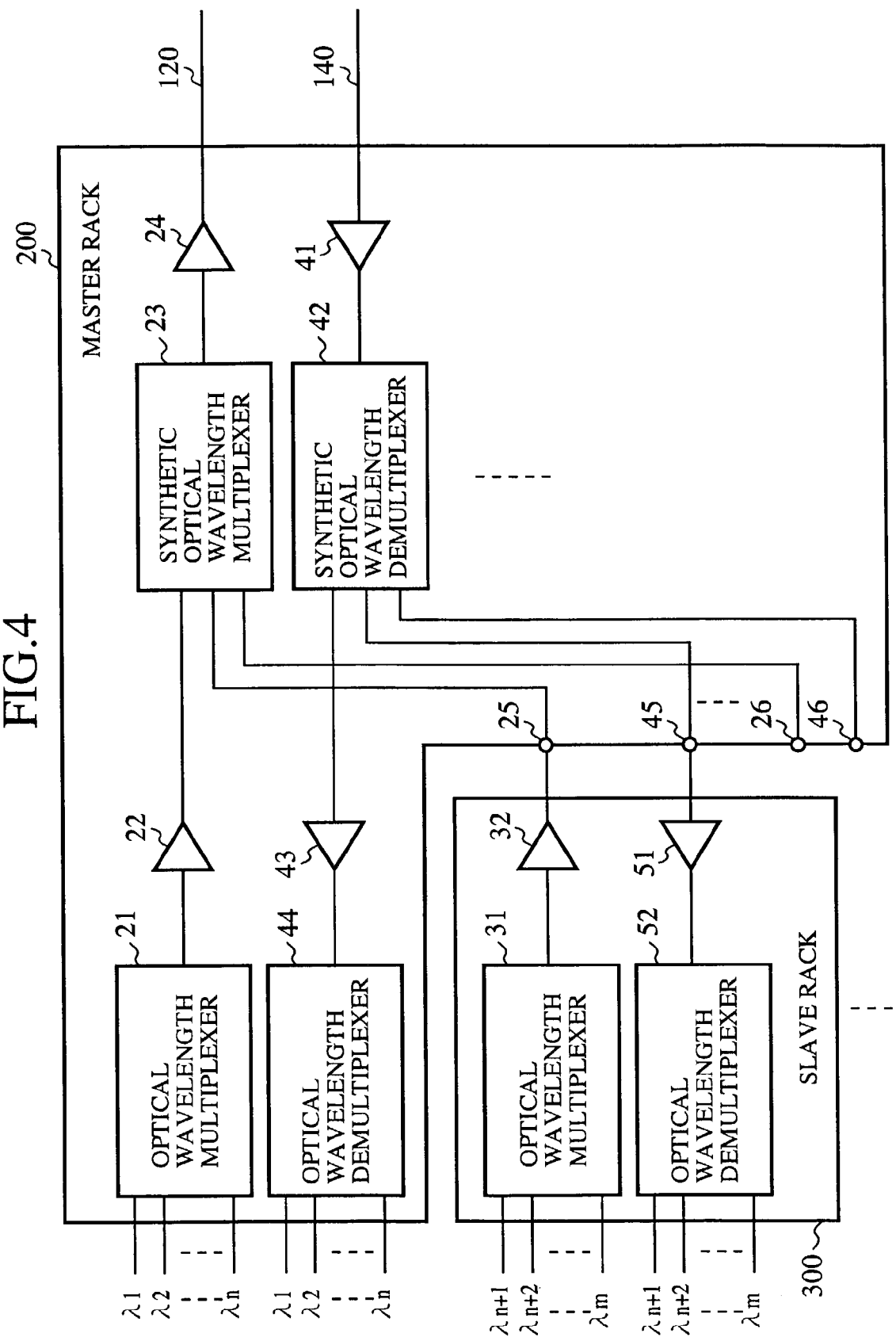
FIG. 4 is a block diagram showing an optical wavelength division multiplexing and transmission apparatus according to a third embodiment of the present invention.

A block diagram of the configuration of an optical wavelength division multiplexing and transmission apparatus, in which circuits of a transmission function and circuits of a reception function are integrally formed, is shown in FIG. 4. In FIG. 4, circuits of a transmission function, which are the same as those shown in FIG. 2, are indicated by the same reference numerals as those of the constituent elements shown in FIG. 2, and circuits of a reception function, which are the same as those shown in FIG. 3, are indicated by the same reference numerals as those of the constituent elements shown in FIG. 3.

120 indicates an optical transmission line through which a synthetic multiplexed signal (or first synthetic multiplexed signal) of the synthetic optical wavelength multiplexer 23 is transmitted to a receiver of the opposite end. 140 indicates an optical transmission line through which a synthetic multiplexed signal (or first synthetic multiplexed signal) of a transmitter of the opposite end is transmitted. A master rack 200 indicates a receiving and transmitting system installed for the early operation. A slave rack 300 is coupled to the master rack 200 in cases where the number of optical wavelength signals processed is increased, and a transmitting and receiving function is expanded by the slave rack 300. Here, because a wavelength distribution of a group of optical wavelength signals denoting an input of the optical wavelength multiplexer (or first optical wavelength multiplexer) 21 is the same that denoting an output of optical wavelength demultiplexer (or first optical wavelength demultiplexer) 44, the optical wavelength signals denoting the input of the optical wavelength multiplexer 21 are indicated by the same reference numerals λ1, λ2, . . . and λn as those denoting the output of optical wavelength demultiplexer 44. In the same manner, in the slave rack 300, a plurality of optical wavelength signals denoting the input are indicated by the same reference numerals λn+1, λn+2, . . . and λm as those denoting the output.

In the master rack 200, a plurality of optical wavelength signals λ1, λ2, . . . and λn are multiplexed in the optical wavelength multiplexer 21, and a multiplexed signal (or first multiplexed signal) is output from the optical wavelength multiplexer 21. This multiplexed signal is amplified in the amplifier 22 and is fed to the synthetic optical wavelength multiplexer 23. In the synthetic optical wavelength multiplexer 23, the multiplexed signal is multiplexed with the same type of multiplexed signal (or second multiplexed signal) as that of the multiplexed signal to obtain a synthetic multiplexed signal (or first synthetic multiplexed signal), and the synthetic multiplexed signal is output to the optical transmission line 120 through the amplifier 24. In the synthetic optical wavelength demultiplexer 42, after a synthetic multiplexed signal (or second synthetic multiplexed signal), which is transmitted from another optical wavelength division multiplexing and transmission apparatus of the opposite end through the optical transmission line 140, is amplified in the amplifier 41, the synthetic multiplexed signal is input and demultiplexed to a plurality of multiplexed signals. One multiplexed signal (or third multiplexed signal) demultiplexed in the synthetic optical wavelength demultiplexer 42 is amplified in the amplifier 43. Thereafter, the multiplexed signal is input to the optical wavelength demultiplexer (or first optical wavelength demultiplexer) 44 and is demultiplexed to the optical wavelength signals $\lambda 1$, $\lambda 2$, . . . and $\lambda n$ of one group.

Also, in cases where the slave rack 300 is coupled to the master rack 200, a plurality of optical wavelength signals $\lambda n+1$, $\lambda n+2$, . . . and $\lambda m$ having a wavelength distribution different from that of the optical wavelength signals $\lambda 1$, $\lambda 2$, . . . and $\lambda n$ are multiplexed with each other in the optical wavelength multiplexer (or second optical wavelength multiplexer) 31, and a multiplexed signal (or second multiplexed signal) is fed to the synthetic optical wavelength multiplexer 23 of the master rack 200 through the amplifier 32. Also, another multiplexed signal, which is formed by demultiplexing the synthetic multiplexed signal transmitted through the optical transmission line 140 in the synthetic optical wavelength demultiplexer 42, is demultiplexed to the optical wavelength signals $\lambda n+1$, $\lambda n+2$, . . . and $\lambda m$ in the optical wavelength demultiplexer (or second optical wavelength demultiplexer) 52, and the optical wavelength signals $\lambda n+1$, $\lambda n+2$, . . . and $\lambda m$ is output.

As is described above, in the third embodiment, when the slave rack 300 is additionally installed in the optical wavelength division multiplexing and transmission apparatus, the slave rack 300 can be easily and additionally installed without stopping the operation of the system installed for the early operation. Also, because each of the master rack 200 and the slave rack 300 accommodates circuits of an optical multiplexing function and circuits of an optical demultiplexing function, the circuits of the optical multiplexing function and the circuits of the optical demultiplexing function in the slave rack 300 can be simultaneously and additionally installed in the optical wavelength division multiplexing and transmission apparatus, and workability can be further improved in the optical wavelength division multiplexing and transmission apparatus.

Embodiment 4

Figure 5:
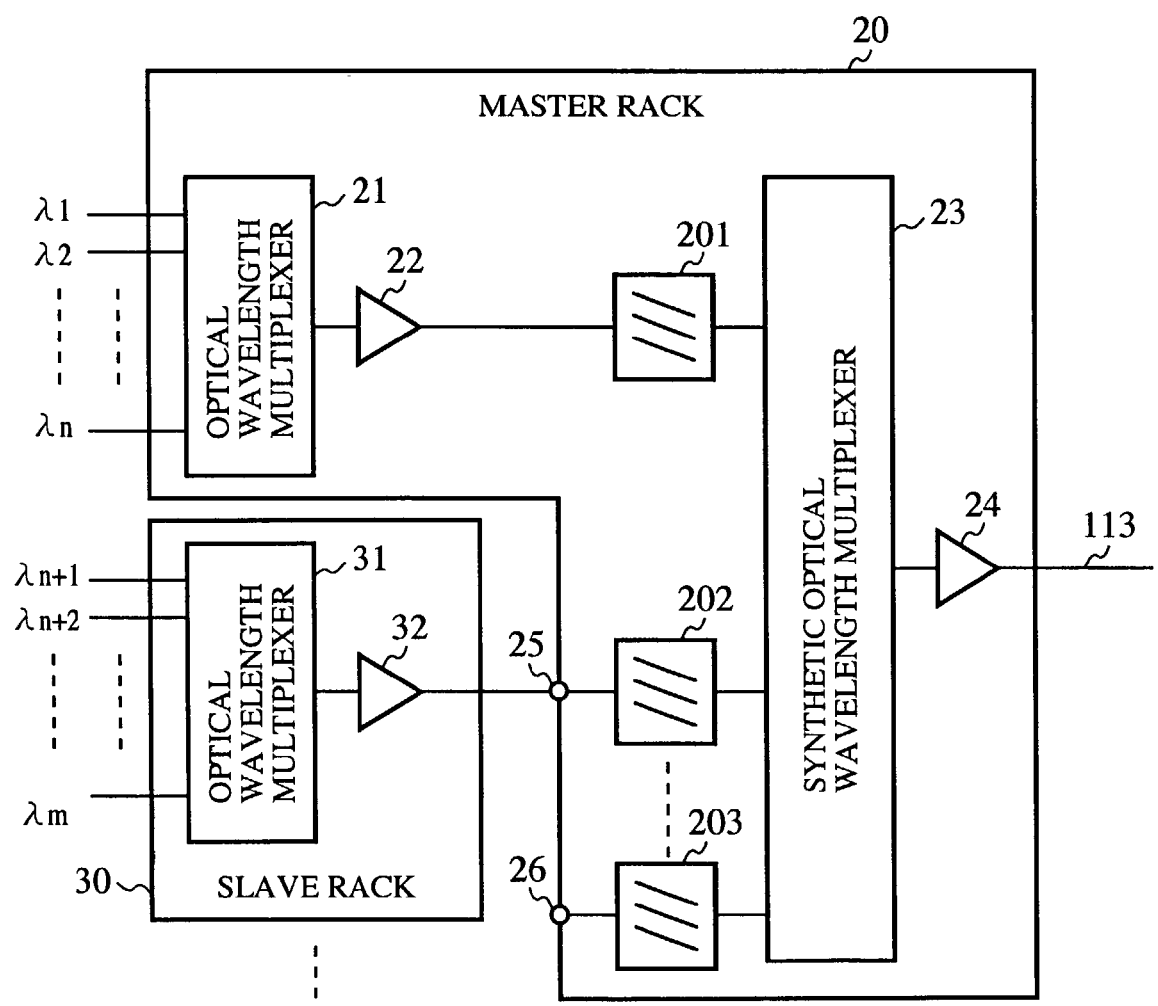
FIG. 5 is a block diagram showing an optical wavelength division multiplexing and transmission apparatus according to a fourth embodiment of the present invention.

A block diagram of the configuration of an optical wavelength division multiplexing and transmission apparatus, in which an additional circuit is installed on the transmitter end, is shown in FIG. 5. In FIG. 5, the additional circuit is formed of a plurality of noise cut filters 201, 202 and 203 installed on the input side of the synthetic optical wavelength multiplexer 23.

When the group of optical wavelength signals $\lambda 1$, $\lambda 2$, . . . and $\lambda n$ multiplexed in the first optical wavelength multiplexer 21 is multiplexed in the synthetic optical wavelength multiplexer 23 with the group of optical wavelength signals $\lambda n+1$, $\lambda n+2$, . . . and $\lambda m$ multiplexed in the optical wavelength multiplexer 31, noise components included in the groups of optical wavelength signals are added to each other so as to increase a noise level, and an S/N ratio of the synthetic multiplexed signal is lowered. To prevent the lowering of the S/N ratio, a band of a prescribed band width is set for each group of optical wavelength signals, and unnecessary signal components existing outside the band are cut away in each of the noise cut filters 201, 202 and 203. In FIG. 5, the noise cut filters 201, 202 and 203 are installed in the master rack 20. However, it is applicable that the noise cut filters 202 and 203 be installed in the slave racks 30 respectively. Also, the installation of the noise cut filters 201, 202 and 203 can be adapted for the optical wavelength division multiplexing and transmission apparatus of FIG. 4 functioning as a transceiver.

As is described above, in the fourth embodiment, the noise cut filters 201, 202 and 203 are inserted into the optical wavelength division multiplexing and transmission apparatus so as to transmit only an effective wavelength portion of each group of optical wavelength signals through the corresponding noise cut filter. Therefore, communication quality of the optical wavelength division multiplexing and transmission apparatus can be improved.

Embodiment 5

Figure 6:
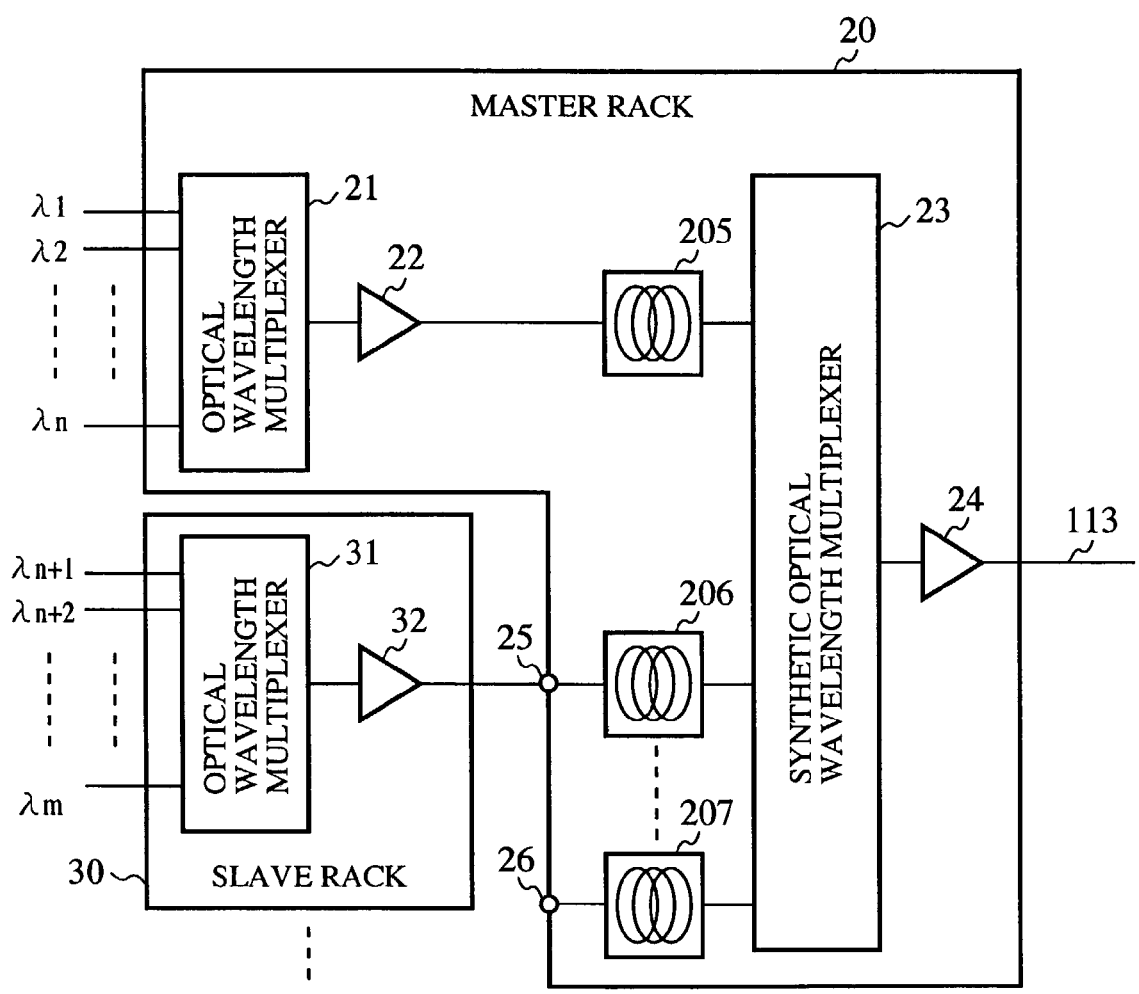
FIG. 6 is a block diagram showing an optical wavelength division multiplexing and transmission apparatus according to a fifth embodiment of the present invention.

A block diagram of the configuration of an optical wavelength division multiplexing and transmission apparatus, in which a plurality of dispersion compensation fibers 205, 206 and 207 are installed on the receiver end as an additional circuit, is shown in FIG. 6. In detail, the dispersion compensation fibers 205, 206 and 207 are installed on the input side of the synthetic optical wavelength multiplexer 23 of the master rack 20.

When each optical wavelength signal is transmitted through an optical fiber of a transmission line, a wavelength distortion occurs in the optical wavelength signal due to the dispersion of the optical wavelength signal peculiar to the optical fiber. Therefore, the transmission quality of the optical wavelength signal is lowered. To prevent the lowering of the transmission quality, each multiplexed signal is fed to the synthetic optical wavelength multiplexer 23 through the corresponding dispersion compensation fiber 205, 206 or 207 so as to compensate for the dispersion of the multiplexed signal expected to be accumulated in an optical fiber of a transmission line. Each of the dispersion compensation fibers 205, 206 and 207 has a function of preventing the dispersion of the multiplexed signal occurring in an optical fiber of a transmission line, and the distortion of each optical wavelength signal can be prevented. Here, in the same manner as the installation of the noise cut filters 202 and 203, it is applicable that the dispersion compensation fibers 206 and 207 be installed in the slave racks 30 respectively. Also, the installation of the dispersion compensation fibers 205, 206 and 207 can be adapted for the optical wavelength division multiplexing and transmission apparatus of FIG. 4 functioning as a transceiver.

As is described above, the dispersion compensation fibers 205, 206 and 207 are inserted into the optical wavelength division multiplexing and transmission apparatus, and the communication quality of the WDM transmission system can be improved.

Embodiment 6

Figure 7:
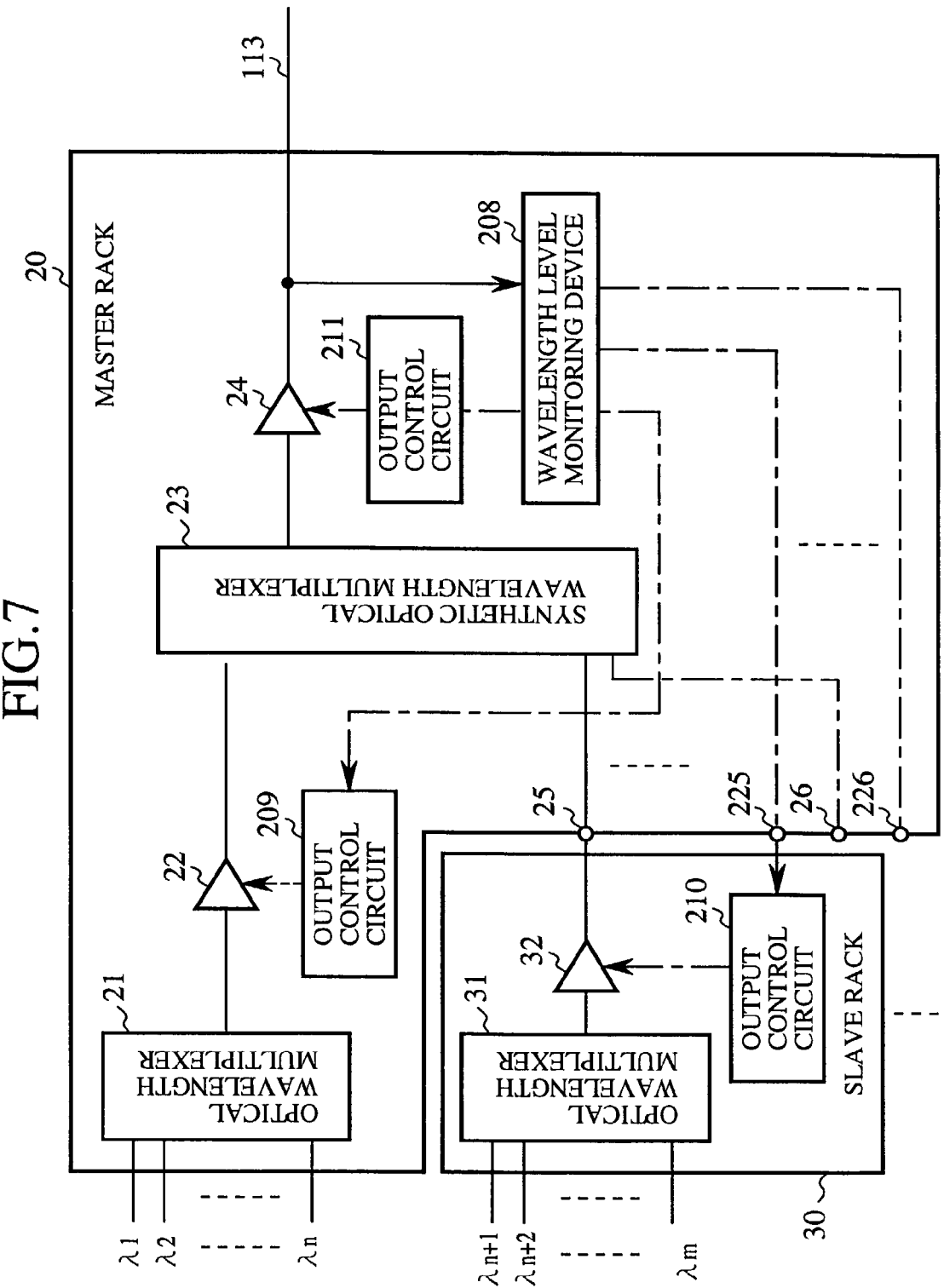
FIG. 7 is a block diagram showing an optical wavelength division multiplexing and transmission apparatus according to a sixth embodiment of the present invention.

A block diagram of the configuration of an optical wavelength division multiplexing and transmission apparatus, in which a wavelength level monitoring device 208 and a plurality of output control circuits 209, 210 and 211 are installed on the receiver end as an additional circuit, is shown in FIG. 7.

In the master rack 20, the wavelength level monitoring device 208 has a function of monitoring levels of the optical wavelength signals of the synthetic multiplexed signal which is output from the amplifier 24. A monitored level of each optical wavelength signal detected in the wavelength level monitoring device 208 is fed back to the corresponding amplifier 22 or 32 through the corresponding output control circuit 209 or 210 installed in the master rack 20 or the slave rack 30, and the output control circuits 209 and 210 control the amplifiers 22 and 32 respectively to equalize levels of the optical wavelength signals of the multiplexed signals (or first and second multiplexed signals) with each other. Also, the output control circuit 211 controls the amplifier 24 to set a level of the synthetic multiplexed signal output from the amplifier 24 of the final stage to a predetermined value.

As is described above, in the sixth embodiment, level differences among the multiplexed signals of the groups of optical wavelength signals can be corrected before the signal transmission, and the transmission qualities of the multiplexed signals can be equally maintained.

What is claimed is:

1. An optical wavelength division multiplexing and transmission apparatus, comprising a master rack and at least one slave rack to be combined with the master rack, wherein
   the master rack has a plurality of optical connectors configured to connect to a respective slave rack, and the master rack accommodates:
      a first optical wavelength multiplexer to multiplex a number of prescribed optical wavelength signals corresponding to a prescribed wavelength distribution and to output as a first multiplexed signal;
      a synthetic optical wavelength multiplexer to multiplex the first multiplexed signal and a second multiplexed signal and to output as a synthetic multiplexed signal; and
      a first optical amplifier in which the synthetic multiplexed signal output from the synthetic optical wavelength multiplexer is multiplied, and
   the at least one slave rack is connected to an optical connector of the plurality of optical connectors, and the at least one slave rack accommodates:
      a second optical wavelength multiplexer to multiplex a group of optical wavelength signals having a wavelength distribution that is different from the prescribed wavelength distribution and to output as the second multiplexed signal; and
      a second optical amplifier in which the second multiplexed signal output from the second optical wavelength multiplexer is multiplied,
   wherein a number of optical wavelength signals in the synthetic multiplexed signal in excess of the number of prescribed optical wavelength signals is divided into a plurality of slave rack groups and one slave rack is connected to the master rack for each slave rack group of the plurality of slave rack groups.

2. An optical wavelength division multiplexing and transmission apparatus according to claim 1, further comprising a plurality of noise cut filters corresponding to the first multiplexed signal and the second multiplexed signal respectively on an input side of the synthetic optical wavelength multiplexer on which the first multiplexed signal and the second multiplexed signal are input.

3. An optical wavelength division multiplexing and transmission apparatus according to claim 1, further comprising a plurality of dispersion compensation fibers corresponding to the first multiplexed signal and the second multiplexed signal respectively on an input side of the synthetic optical wavelength multiplexer on which the first multiplexed signal and the second multiplexed signal are input.

4. An optical wavelength division multiplexing and transmission apparatus according to claim 1, further comprising a third optical amplifier of the master rack for the first multiplexed signal, a wavelength level monitoring device of the master rack for monitoring an output of the first optical amplifier for the synthetic multiplexed signal, and a plurality of output control circuits for selectively controlling a plurality of levels of signals output from the third optical amplifier for the first multiplexed signal, the second optical amplifier for the second multiplexed signal and the first optical amplifier for the synthetic multiplexed signal respectively in response to a detection output of the wavelength level monitoring device in which a plurality of levels of the optical wavelength signals of the first multiplexed signal, the second multiplexed signal and the synthetic multiplexed signal are monitored.

5. An optical wavelength division multiplexing and transmission apparatus according to claim 1, wherein the master rack further accommodates a third optical amplifier in which the first multiplexed signal output from the first optical wavelength multiplexer is multiplied.

6. An optical wavelength division multiplexing and transmission apparatus, comprising a master rack and at least one slave rack to be combined with the master rack, wherein
   the master rack has a plurality of optical connectors configured to connect to a respective slave rack, and the master rack accommodates:
      synthetic optical wavelength demultiplexer to input a synthetic multiplexed signal formed by multiplexing respective multiplexed signals of groups of optical wavelength signals, which are grouped with different optical wavelength distributions, and to demultiplex and output as a first multiplexed signal and a second multiplexed signal from the synthetic multiplexed signal; and
      a first optical wavelength demultiplexer to demultiplex and output a group of optical wavelength signals from the first multiplexed signal demultiplexed by the synthetic optical wavelength demultiplexer, and
   the at least one slave rack is connected to an optical connector of the plurality of optical connectors, and the at least one slave rack accommodates;
      a second optical wavelength demultiplexer to demultiplex and output another group of optical wavelength signals from the second multiplexed signal demultiplexed by the synthetic optical wavelength demultiplexer; and
      a first optical amplifier in which the second multiplexed signal output from the synthetic optical wavelength demultiplexer is multiplied,
   wherein a number of optical wavelength signals in excess of a number of optical wavelength signals in the group of optical wavelength signals from the first multiplexed signal is divided into a plurality of slave rack groups and one slave rack is connected to the master rack for each slave rack group of the plurality of slave rack groups.

7. An optical wavelength division multiplexing and transmission apparatus according to claim 6, wherein the master rack further accommodates:

a second optical amplifier in which the synthetic multiplexed signal is multiplied before being input into the synthetic optical wavelength demultiplexer; and a third optical amplifier in which the first multiplexed signal output from the synthetic optical wavelength demultiplexer is multiplied.

8. An optical wavelength division multiplexing and transmission apparatus, comprising a master rack and at least one slave rack to be combined with and coupled to the master rack, wherein the master rack has a plurality of optical input connectors configured to connect to a respective slave rack, and the master rack accommodates:

a first optical wavelength multiplexer to multiplex a number of prescribed optical wavelength signals corresponding to a prescribed wavelength distribution and to output as a first multiplexed signal;

a synthetic optical wavelength multiplexer to multiplex the first multiplexed signal and a second multiplexed signal and to output as a first synthetic multiplexed signal;

a first optical amplifier in which the first synthetic multiplexed signal output from the synthetic optical wavelength multiplexer is multiplied;

a synthetic optical wavelength demultiplexer to demultiplex and output as a third multiplexed signal and a fourth multiplexed signal from a second synthetic multiplexed signal transmitted from another optical wavelength division multiplexing and transmission apparatus through an optical transmission line; and a first optical wavelength demultiplexer to demultiplex and output a group of optical wavelength signals from the third multiplexed signal output from the synthetic optical wavelength demultiplexer, and the at least one slave rack is connected to at least one optical connector of the plurality of optical connectors, and the at least one slave rack accommodates:

a second optical wavelength multiplexer to multiplex a group of optical wavelength signals having a wavelength distribution that is different from the prescribed wavelength distribution to output as the second multiplexed signal;

a second optical amplifier in which the second multiplexed signal output from the second optical wavelength multiplexer is multiplied; and a second optical wavelength demultiplexer to demultiplex and output another group of optical wavelength signals from the fourth multiplexed signal demultiplexed by the synthetic optical wavelength demultiplexer, wherein a number of optical wavelength signals in the first synthetic multiplexed signal in excess of the number of prescribed optical wavelength signals is divided into a plurality of slave rack groups and one slave rack is connected to the master rack for each slave rack group of the plurality of slave rack groups.

9. An optical wavelength division multiplexing and transmission apparatus according to claim 8, further comprising a plurality of noise cut filters corresponding to the first multiplexed signal and the second multiplexed signal respectively on an input side of the synthetic optical wavelength multiplexer on which the first multiplexed signal and the second multiplexed signal are input.

10. An optical wavelength division multiplexing and transmission apparatus according to claim 8, further comprising a plurality of dispersion compensation fibers corresponding to the first multiplexed signal and the second multiplexed signal respectively on an input side of the synthetic optical wavelength multiplexer on which the first multiplexed signal and the second multiplexed signal are input.

11. An optical wavelength division multiplexing and transmission apparatus according to claim 8, wherein the slave rack further accommodates a third optical amplifier in which the fourth multiplexed signal output from the synthetic optical wavelength demultiplexer is multiplied.

12. An optical wavelength division multiplexing and transmission apparatus according to claim 11, wherein the master rack further accommodates:

a fourth optical amplifier in which the first multiplexed signal output from the first optical wavelength multiplexer is multiplied;

a fifth optical amplifier in which the second synthetic multiplexed signal is multiplied before being input into the synthetic optical wavelength demultiplexer; and a sixth optical amplifier in which the third multiplexed signal output from the synthetic optical wavelength demultiplexer is multiplied.

13. An optical wavelength division multiplexing and transmission apparatus according to claim 8, wherein the master rack further accommodates:

a third optical amplifier in which the first multiplexed signal output from the first optical wavelength multiplexer is multiplied;

a fourth optical amplifier in which the second synthetic multiplexed signal is multiplied before being input into the synthetic optical wavelength demultiplexer; and a fifth optical amplifier in which the third multiplexed signal output from the synthetic optical wavelength demultiplexer is multiplied.

* * * * *